United States Patent
Choi et al.

(10) Patent No.: US 9,510,279 B2
(45) Date of Patent: Nov. 29, 2016

(54) INTELLIGENT MULTIPLE ACCESS COMMUNICATION CONTROL APPARATUS AND METHOD

(71) Applicant: ELECTRONICS AND TELECOMMUNICATIONS RESEARCH INSTITUTE, Daejeon (KR)

(72) Inventors: Yong-Seouk Choi, Daejeon (KR); Sook-Jin Lee, Daejeon (KR); Youn-Ok Park, Daejeon (KR); Dong-Seung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 77 days.

(21) Appl. No.: 14/293,903

(22) Filed: Jun. 2, 2014

(65) Prior Publication Data

US 2014/0355521 A1 Dec. 4, 2014

(30) Foreign Application Priority Data

Jun. 3, 2013 (KR) .................. 10-2013-0063664

(51) Int. Cl.
*H04W 48/18* (2009.01)
*H04W 88/06* (2009.01)
*H04W 76/02* (2009.01)

(52) U.S. Cl.
CPC .......... *H04W 48/18* (2013.01); *H04W 76/026* (2013.01); *H04W 88/06* (2013.01)

(58) Field of Classification Search
CPC . H04W 36/00; H04W 28/16; H04W 72/085; H04W 72/1231; H04W 36/08
See application file for complete search history.

(56) References Cited

U.S. PATENT DOCUMENTS

| 9,215,646 B2 | 12/2015 | Lee et al. |
| 9,369,954 B2 | 6/2016 | Lee et al. |
| 2009/0185511 A1* | 7/2009 | Lee ................. H04L 5/1469 370/280 |
| 2010/0220665 A1* | 9/2010 | Govindan .......... H04L 47/10 370/329 |
| 2011/0002305 A1* | 1/2011 | Park ................. H04W 36/0066 370/331 |
| 2011/0044218 A1* | 2/2011 | Kaur ............... H04W 76/026 370/310 |
| 2013/0201956 A1 | 8/2013 | Cho et al. |
| 2013/0237226 A1* | 9/2013 | Periyalwar ....... H04W 76/026 455/436 |

(Continued)

FOREIGN PATENT DOCUMENTS

| KR | 10-2010-0072581 A | 7/2010 |
| KR | 10-2011-0024855 A | 3/2011 |

(Continued)

*Primary Examiner* — Benjamin H Elliott, IV
(74) *Attorney, Agent, or Firm* — Rabin & Berdo, P.C.

(57) ABSTRACT

An intelligent multiple access communication (MAC) control apparatus and method are disclosed. The intelligent MAC control apparatus includes a connection control unit, a resource management unit, a session control unit, a flow control unit, and a determination unit. The connection control unit connects at least one Radio Access Technology (RAT) and a wireless network. The resource management unit collects RAT information including information about available resources and radio state of the RAT. The session control unit checks the QoS of at least one connection target service. The flow control unit determines the priority of the connection target service, and selects a preferential connection target service. The determination unit determines a connection RAT for performing the preferential connection target service based on the QoS and the RAT information.

15 Claims, 4 Drawing Sheets

(56) References Cited

U.S. PATENT DOCUMENTS

2013/0324140 A1   12/2013  Kwon et al.
2014/0050320 A1*  2/2014  Choyi .................... H04L 63/08
                                                                                 380/270
2014/0355521 A1*  12/2014  Choi ..................... H04W 48/18
                                                                                 370/328

FOREIGN PATENT DOCUMENTS

| KR | 10-2011-0068700 A | 6/2011 |
| KR | 10-2012-0035871 A | 4/2012 |
| KR | 10-2012-0094379 A | 8/2012 |
| KR | 10-2013-0040242 A | 4/2013 |
| WO | WO 2012-134244 A2 | 10/2012 |

* cited by examiner

INTELLIGENT MULTIPLE ACCESS COMMUNICATION CONTROL APPARATUS AND METHOD

CROSS REFERENCE TO RELATED APPLICATION

This application claims the benefit of Korean Patent Application No. 10-2013-0063664, filed on Jun. 3, 2013, which is hereby incorporated by reference in its entirety into this application.

BACKGROUND OF THE INVENTION

1. Technical Field

The present invention relates generally to an apparatus and method for efficient and intelligent multiple access communication control in a multi-mode terminal and, more particularly, to an intelligent multiple access communication control apparatus and method that are capable of seamlessly accessing various multiple wireless networks even without additionally changing a network.

2. Description of the Related Art

A multi-mode terminal is a terminal having multiple modes, and may make wireless access using a variable mode depending on the circumstance. For example, popular smartphones include two modes for 3G and Wi-Fi connections. Korean Patent Application Publication No. 2011-0024855 discloses technology in which a multi-mode terminal selects a mode from among simply integrated multiple modes, uses the selected mode and switches between the modes depending on the circumstance. That is, the terminal disclosed in this patent publication is a multi-mode terminal, but is limited in that only a single mode should be selected and used during operation.

SUMMARY OF THE INVENTION

Accordingly, the present invention has been made keeping in mind the above problems occurring in the conventional art, and an object of the present invention is to enable a multi-mode terminal to use multiple modes at the same time, thereby improving the traffic efficiency of terminal service.

Another object of the present invention is to provide a method that is capable of accessing multiple multi-wireless networks without additionally changing a network.

Yet another object of the present invention is to provide a technology that is capable of handling different protocols in which an MAC (medium access control) layer has been already present in multiple different wireless access methods.

In accordance with an aspect of the present invention, there is provided an intelligent multiple access communication control method, including connecting at least one Radio Access Technology (RAT) and a wireless network; collecting RAT information including information about the available resources and radio state of the RAT; checking the Quality of Service (QoS) of at least one connection target service; determining the priority of the connection target service, and selecting a preferential connection target service; determining a connection RAT for performing the preferential connection target service based on the QoS and the RAT information; and initiating the preferential connection target service via the connection RAT.

Connecting the least one RAT and the wireless network may include connecting the at least one RAT and the wireless network via RAT MAC corresponding to the RAT.

The RAT MAC connects the at least one RAT and the wireless network through signaling in accordance with a protocol rule of the RAT MAC.

Collecting the RAT information may include collecting the RAT information from a RAT scheduler configured to periodically collect resources of the RAT and correspond to the RAT.

Checking the QoS of the at least one connection target service may include checking the QoS of the connection target service for each session.

Selecting the preferential connection target service may include selecting the preferential connection target service based on the QoS.

Determining the connection RAT for performing the preferential connection target service may include determining the connection RAT for each session.

Initiating the preferential connection target service may include transferring an IP packet to the connection RAT.

In accordance with another aspect of the present invention, there is provided an intelligent multiple access communication control apparatus, including a connection control unit configured to connect at least one Radio Access Technology (RAT) and a wireless network; a resource management unit configured to collect RAT information including information about the available resources and radio state of the RAT; a session control unit configured to check the QoS of at least one connection target service; a flow control unit configured to determine the priority of the connection target service, and to select a preferential connection target service; and a determination unit configured to determine a connection RAT for performing the preferential connection target service based on the QoS and the RAT information.

The connection control unit may initiate the preferential connection target service via the connection RAT.

The connection control unit may connect the at least one RAT and the wireless network via RAT MAC corresponding to the RAT.

The RAT MAC may connect the at least one RAT and the wireless network through signaling in accordance with a protocol rule of the RAT MAC.

The resource management unit may collect the RAT information from a RAT scheduler configured to periodically collect resources of the RAT and correspond to the RAT.

The session control unit may check the QoS of the connection target service for each session.

The flow control unit may select the preferential connection target service based on the QoS.

The determination unit may determine the connection RAT for each session.

The connection control unit may transfer an IP packet to the connection RAT.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

The present invention proposes a method of increasing the entire bandwidth of a terminal in such a manner that the terminal collects and uses radio resources through different types of radio access methods at the same time in a structure that enables heterogeneous types of radio access. Heterogeneous networks have different wireless assignment methods and different Quality of Service (QoS) control methods because they use different access methods. In the future, there is a strong possibility that the cell configuration of a mobile communication system will be developed into a hierarchical structure. That is, the future structure will be an environment in which various cell configurations having multiple methods coexist. Accordingly, a terminal that is provided with a service requires a scheme for dynamically accessing a specific cell while moving between different cells. For this purpose, an access network, such as a base station, and a network part needs to be changed or a network configuration itself needs to be changed. This causes a cost problem and the problem of compatibility with an existing system. The present invention proposes a method that is capable of maximizing the use of radio and network resources without changing an existing network through the integration technology of an existing terminal MAC layer. An intelligent multiple access communication control method according to an embodiment of the present invention includes two layers, and operates to satisfy different structures and multiple QoS conditions. An intelligent multiple access communication control method according to an embodiment of the present invention provides a method for accessing multiple multi-wireless networks seamlessly even without additionally changing a network. This intelligent multiple access communication control method is consistent with the direction of the development of mobile communication that is intended to enable a wireless access method to be freely changed in a cell configuration in which multiple various types of radio access methods coexist. Accordingly, an intelligent multiple access communication control method according to an embodiment of the present invention requires that a technique capable of handling different protocols in which the MAC layer has been already present in multiple different wireless access methods be provided.

Embodiments of the present invention will be described in detail below with reference to the accompanying drawings.

Figure 1:
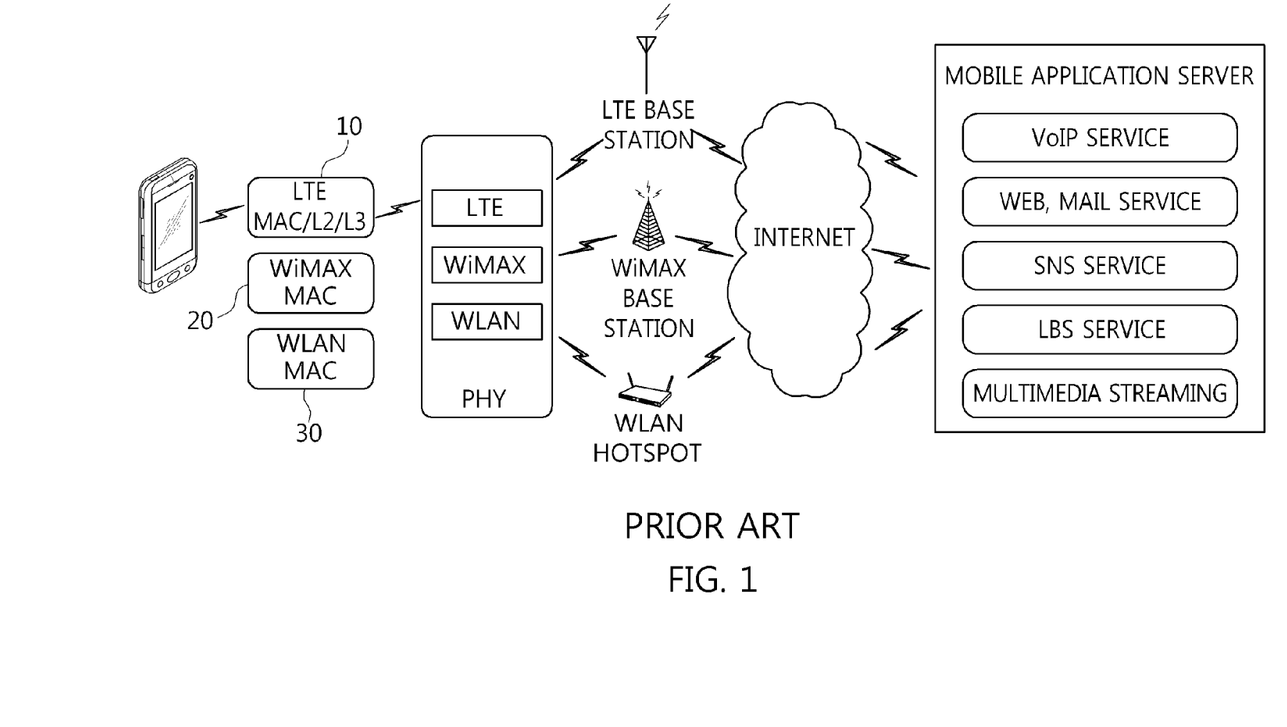
FIG. 1 is a diagram illustrating a known multiple access communication control method that supports a multi-mode terminal.
Figure 2:
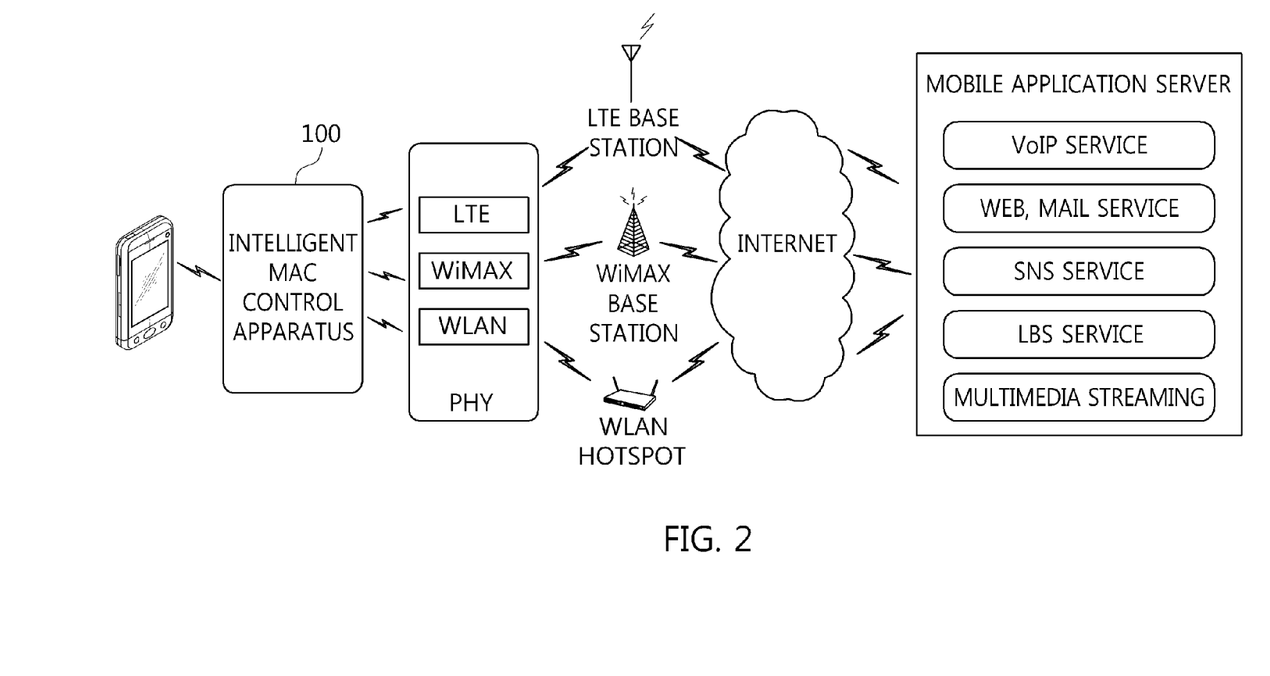
FIG. 2 is a diagram illustrating a multiple access communication control method that supports a multi-mode terminal according to an embodiment of the present invention.

FIG. 1 is a diagram illustrating a known multiple access communication control method that supports a multi-mode terminal, and FIG. 2 is a diagram illustrating a multiple access communication control method that supports a multi-mode terminal according to an embodiment of the present invention.

Referring to FIG. 1, although the known multiple access communicatin control method that supports a multi-mode terminal supports multiple modes, it cannot operate two or more types of modes at the same time but selectively operates any one type of mode. From FIG. 1, it can be seen that, for example, only the LTE mode of LTE, WiMax and WLAN modes is used for momentary operation. Accordingly, in the case of an MAC, only LTE MAC/L2/L3 mode 10 of LTE MAC 10, WIMAX MAC 20, and WLAN MAC 30 is operated. That is, the known multi-mode terminal uses a method of selecting a single mode from among the simply integrated LTE, WiMax and WLAN modes, using the selected mode, and switching between the modes depending on the circumstance. Accordingly, although the terminal is a multi-mode type of terminal, the terminal uses a method of selecting and using only a single type of mode during operation.

Referring to FIG. 2 an intelligent multiple access communication control apparatus 100 according to an embodiment of the present invention operates the LTE, WiMax and WLAN modes, that is, the various types of modes of a multi-mode terminal, in an integrated manner. Accordingly, traffic that is being provided can be transmitted and received via various different modes at the same time. This enables the traffic transmission and reception performance of a multi-mode terminal to be extended to the extent to which the performances of the various modes have been added, and the QoS condition of a service that is being provided can be easily satisfied thanks to the increased service traffic capacity.

Figure 3:
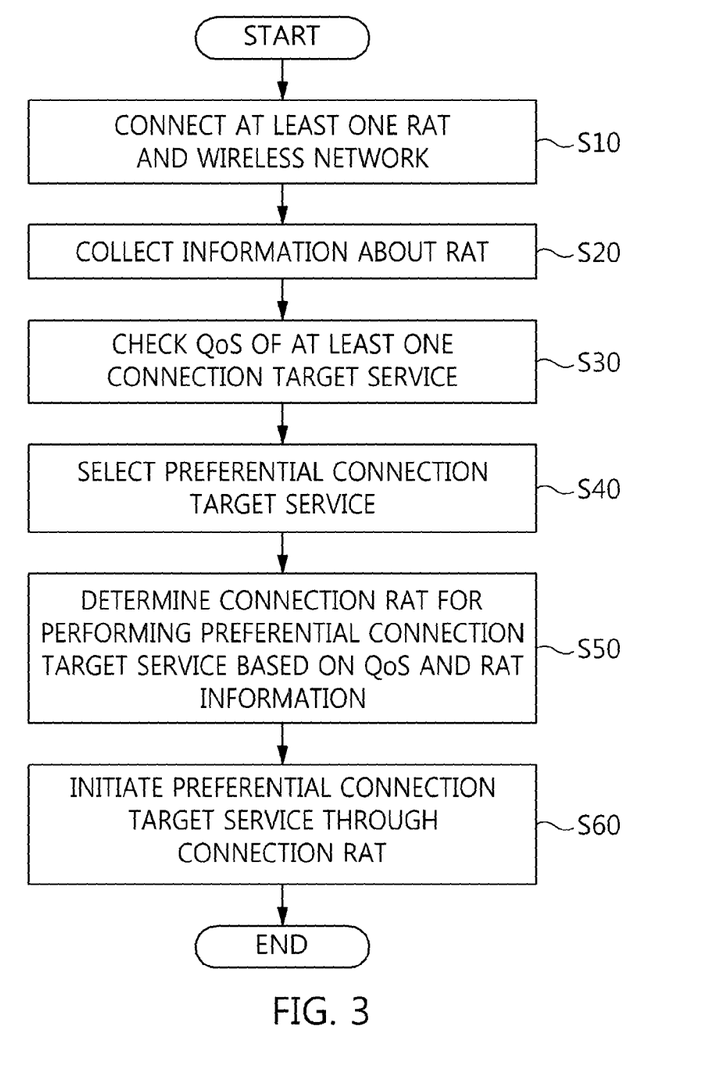
FIG. 3 is a flowchart illustrating an intelligent multiple access communication control method according to an embodiment of the present invention.

An intelligent multiple access communication control method according to an embodiment of the present invention will be described below. FIG. 3 is a flowchart illustrating the intelligent multiple access communication control method according to this embodiment of the present invention.

Referring to FIG. 3, the intelligent multiple access communicatiob control method according to this embodiment of the present invention includes connecting at least one Radio Access Technology (RAT) and a wireless network at step S10, collecting RAT information including information about the available resources and radio state of the RAT at step S20, checking the QoS of at least one connection target service at step S30, determining the priority of the connection target service and selecting a preferential connection target service at step S40, determining a connection RAT for performing the preferential connection target service based on the QoS and the RAT information at step S50, and initiating the preferential connection target service via the connection RAT at step S60.

Step S10 of connecting the at least one RAT and the wireless network will now be described. For example, when a terminal is powered on, the MACs of for all RATs, which may be supported by the terminal, are commanded to perform an access procedure for accessing a wireless network. The MAC of each RAT that has received an access procedure execution request makes access to a corresponding wireless network through signaling in accordance with its own protocol rules. In this case, the MAC of each RAT is a MAC corresponding to each RAT, and may be, for example, WIBRO MAC, WLAN MAC, or LTE MAC/L2/L3. The MAC of each RAT is called the RAT MAC.

This wireless network access procedure continues until access is completed for each RAT. Once the access procedure has been completed, a terminal becomes ready to provide service through a RAT supported by the terminal over each wireless network.

Step S20 of collecting RAT information including the available resources and radio state of the RAT will now be described. At step S20, the RAT information may be collected from a RAT scheduler configured to periodically manage the resources of the RAT and correspond to the RAT.

Each RAT scheduler periodically determines whether or not the resources of each RAT are available and determines the radio state of the RAT in accordance with its own unique wireless access method. Accordingly, RAT information is received from each scheduler. The RAT information includes information about whether or not the resources of each RAT are available and information about the radio state of the RAT.

Thereafter, step S30 of checking the QoS of at least one connection target service is performed. Step S30 will now be described. At step S30, the QoS of a connection target service may be checked for each session. Once a session for each service has been established by a signaling procedure, a signaling procedure is performed in order to start the service, and thus the session for the service is established. In this case, the established session may be managed.

Thereafter, the priority of the connection target service is determined and a preferential connection target service is selected at step S40. A service for each session has a different QoS depending on the type and state of service. The preferential connection target service may be selected based on the QoS. In this case, the service refers to a service connected by a terminal over a wireless communication network, and may include a VoIP service, a WEB service, a mail service, an SNS service, an LBS service, and a multimedia streaming service. The established session is mapped to the QoS for each session. Accordingly, the QoS for each session may be managed, and a priority may be assigned to the service for the session. In order for a terminal to be provided with a service, the terminal performs a call access procedure in accordance with a procedure determined by a corresponding radio method. When the call access procedure is normally performed, a session for the service is established. The data of the terminal service is transmitted and received via the predetermined session, which is called a service flow. The service flow has a QoS condition that complies with each service characteristic. A priority can be assigned to the service based on the QoS of the service flow.

Thereafter, at step S50, a connection RAT for performing the preferential connection target service is determined based on the QoS and the RAT information. In this case, the connection RAT means a RAT for connecting the priority connection target service, determined at step S40, to a wireless network. For example, the preferential connection target service may be an SNS service, and an LTE RAT may be determined in order to connect the SNS service to a wireless network. At step S50, the connection RAT may be determined for each session.

Thereafter, at step S60, the preferential connection target service is initiated via the connection RAT. At step S60, the preferential connection target service may be initiated by transferring an IP packet to the connection RAT.

Figure 4:
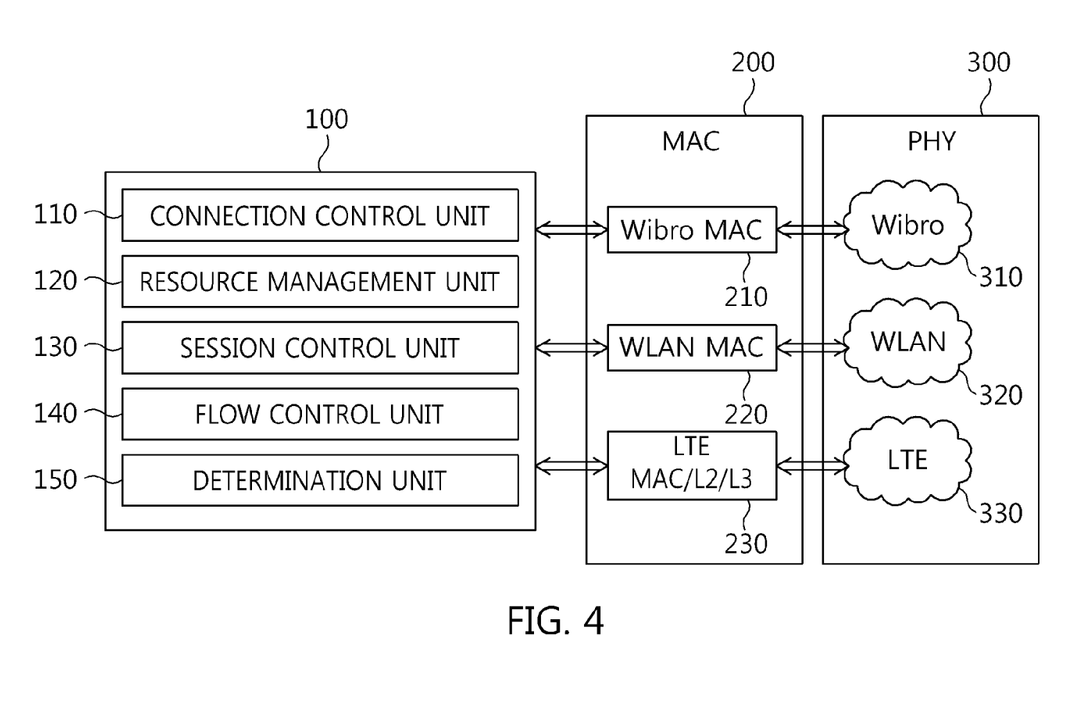
FIG. 4 is a block diagram of an intelligent multiple access communication control apparatus according to an embodiment of the present invention.

An intelligent multiple access communication control apparatus according to an embodiment of the present invention will now be described. FIG. 4 is a block diagram of the intelligent multiple access communication control apparatus according to this embodiment of the present invention.

Referring to FIG. 4, the intelligent multiple access communication control apparatus 100 according to this embodiment of the present invention includes a connection control unit 110 configured to connect at least one Radio Access Technology (RAT) and a wireless network, a resource management unit 120 connected to collect RAT information including information about the available resources and radio state of the RAT, a session control unit 130 configured to check the QoS of at least one connection target service, a flow control unit 140 configured to determine the priority of the connection target service and to select a preferential connection target service, and a determination unit 150 configured to determine a connection RAT for performing the preferential connection target service based on the QoS and the RAT information.

Each MAC 210, 220 or 230 of the RAT includes a subordinate wireless connection function for each RAT. A RAT scheduler manages the radio resources of the corresponding RAT using the wireless connection function. The MAC that processes each RAT has a unique radio access scheme based on a corresponding radio access method. That is, a radio access scheme varies depending on each RAT. Accordingly, the determination unit 150 has a structure that operates in conjunction with the scheduler of each RAT. The scheduler of each RAT periodically reports information about radio resources, such as available resources, to the determination unit 150. The determination unit 150 becomes aware of an available resource state for each RAT based on information about radio resources that is provided by the scheduler of each RAT. Accordingly, the intelligent multiple access communication control apparatus 100 according to this embodiment of the present invention may manage, in an integrated manner, the radio resources 310, 320, and 330 of all RATs that are supported by a terminal without being limited to radio resources that are managed in relation to only one RAT as in the prior art.

Each of the elements will now be described. The connection control unit 110 has a function of setting up, releasing, maintaining, and managing the wireless connection of each RAT. The connection control unit 110 commands all RATs, which may be supported by a terminal, to perform a wireless communication network access procedure. For example, when a terminal is powered on, the connection control unit 110 commands the MACs of for all RATs, which may be supported by the terminal, to perform an access procedure for accessing a wireless network. The MAC of each RAT that has received an access procedure execution request makes access to a corresponding wireless network through signaling in accordance with its own protocol rules. In this case, the MAC of each RAT is a MAC corresponding to each RAT, and may be, for example, WIBRO MAC 210, WLAN MAC 220, or LTE MAC/L2/L3 230. The MAC of each RAT is called the RAT MAC. Examples of the wireless communication network may be Wibro 310, WLAN 320 and LTE 330.

The resource management unit 120 generates and manages the RAT information of a terminal including information about the radio state and available resources of the RAT. Furthermore, the resource management unit 120 transfers the information to the determination unit 150, and thus provides data that may be scheduled based on the radio resources of all the RATs of the terminal as well as the radio resources of each RAT.

The session control unit 130 provides a mapping function between a service session and an RAT connection. That is, the session control unit 130 checks the QoS of at least one connection target service. In order to initiate a service, a signaling procedure is performed and thus a session for the service is established. In this case, the session control unit 130 manages the established session. A service for each session has a different QoS depending on its type and state. The session control unit 130 may map the established session and a QoS condition and thus assign a priority to a session for each service. In this case, the service refers to a service connected by the terminal over a wireless communication network. The service may include a VoIP service, a WEB service, a mail service, an SNS service, an LBS service, and a multimedia streaming service.

The flow control unit 140 is responsible for a service flow and the selection and mapping of a RAT based on the QoS in relation to the service of a terminal. That is, the flow control unit 140 determines the priority of a connection target service, and selects a preferential connection target service. In order for a terminal to be provided with a service, the terminal performs a call access procedure determined by a corresponding radio method. When the call access procedure is normally performed, a session for the service is established. The data of the terminal service is transmitted and received via the predetermined session, which is called a service flow. The service flow has a QoS that complies with each service characteristic. The flow control unit 140 assigns a priority to the service based on the QoS of the service.

The determination unit 150 determines a connection RAT for performing the preferential connection target service based on the QoS and the RAT information. The determination unit 150 transfers the determined information to the flow control unit 140 and the connection control unit 110 so that the service flow can be transferred. The connection control unit 110 performs a service transmission procedure on the RAT in order to transfer data, and transfers information about the established session to the session control unit 130. The session control unit 130 maps the session to the RAT information based on the received information, and transfers the information to the flow control unit 140. The flow control unit 140 maps the service flow to the session, and transfers information about the mapping to the determination unit 150. In this case, the determination unit 150 selects the most appropriate RAT based on the characteristics and QoS of data that is served for each session, and transfers an IP packet to the selected RAT.

In accordance with the present invention, a multi-mode terminal is enabled to use multiple modes at the same time, thereby improving the traffic efficiency of terminal service.

Furthermore, in accordance with the present invention, a method can be provided that is capable of accessing multiple multi-wireless networks without additionally changing a network.

Moreover, in accordance with the present invention, different protocols in which an MAC layer has been already present can be handled in multiple different wireless access methods.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An intelligent multiple access communication control method for an intelligent multiple access communication control apparatus that controls connections between a terminal that supports a plurality of Radio Access Technologies (RATs) and a plurality of wireless networks each of which corresponds to one of the plurality of RATs, the method comprising:
   commanding, for each RAT, a medium access control (MAC) layer of the terminal to perform an access procedure for accessing one of the wireless networks corresponding to said each RAT;
   connecting the terminal and the wireless networks corresponding to the plurality of RATs for providing a plurality of services via the RATs, each service including a plurality of sessions;
   collecting RAT information including information about available resources and radio state of the RAT;
   checking Quality of Service (QoS) of at least one connection target service;
   determining a priority of the service based on a result of the checking the QoS of each session included in each of the services, and selecting one of the plurality of services as a preferential connection target service;
   determining one of the RATs as a connection RAT for performing the preferential connection target service based on the QoS and the RAT information; and
   initiating the preferential connection target service via the connection RAT.

2. The intelligent multiple access communication control method of claim 1, wherein the MAC layer for each RAT is a RAT MAC.

3. The intelligent multiple access communication control method of claim 2, wherein, for each RAT, the RAT MAC connects the terminal and the wireless network corresponding to said each RAT through signaling in accordance with a protocol rule of the RAT MAC.

4. The intelligent multiple access communication control method of claim 1, wherein the collecting the RAT information comprises periodically collecting resources of each RAT as the RAT information of said each RAT via a RAT scheduler of the intelligent multiple access communication control apparatus.

5. The intelligent multiple access communication control method of claim 1, wherein the selecting the preferential connection target service comprising selecting the preferential connection target service based on the QoS.

6. The intelligent multiple access communication control method of claim 1, wherein
   each service includes a plurality of sessions, and
   the determining the connection RAT for performing the preferential connection target service comprises determining the connection RAT for each session.

7. The intelligent multiple access communication control method of claim 1, wherein the initiating the preferential connection target service comprises transferring an internal protocol (IP) packet via the connection RAT.

8. An intelligent Multiple access communication multi-AC control apparatus that controls connections between a terminal that supports a plurality of Radio Access Technologies (RATs) and a plurality of wireless networks each of which corresponds to one of the plurality of RATs, comprising:
   a computing device, and
   a storage medium containing program instructions stored therein, execution of which by the computing device causes the apparatus to provide the functions of:
   a connection control unit configured to command, for each RAT, a medium access control (MAC) layer of the terminal to perform an access procedure for accessing one of the wireless networks corresponding to said each RAT, and connect the terminal and the wireless networks corresponding to the plurality of RATs for providing a plurality of services via the RATs, each service including a plurality of sessions;

a resource management unit configured to collect RAT information including information about available resources and radio state of the RAT;

a session control unit configured to check Quality of Service (QoS) of each session included in each of the service;

a flow control unit configured to determine a priority of the service based on a result of checking the QoS of each session included in each of the service, and select one of the plurality of services as a preferential connection target service; and a determination unit configured to determine one of the RATs as a connection RAT for performing the preferential connection target service based on QoS of each session and the RAT information.

9. The intelligent multiple access communication control apparatus of claim 8, wherein the connection control unit initiates the preferential connection target service via the connection RAT.

10. The intelligent multiple access communication control apparatus of claim 8, wherein the MAC layer for each RAT is a RAT MAC.

11. The intelligent multiple access communication control apparatus of claim 10, wherein, for each RAT, the RAT MAC connects the terminal and the wireless network corresponding to said each RAT through signaling in accordance with a protocol rule of the RAT MAC.

12. The intelligent multiple access communication control apparatus of claim 8, further including a RAT scheduler being configured to periodically collect resource of each RAT and corresponding to one of the RATs, wherein
the resource management unit collects the RAT information via the RAT scheduler.

13. The intelligent multiple access communication control apparatus of claim 8, wherein the flow control unit selects the preferential connection target service based on the QoS.

14. The intelligent multiple access communication control apparatus of claim 8, wherein
the each service includes a plurality of sessions, and
the determination unit determines the connection RAT for each session.

15. The intelligent multiple access communication control apparatus of claim 9, wherein the connection control unit transfers an internet protocol (IP) packet via the connection RAT.

* * * * *